(12) United States Patent
Goujon et al.

(10) Patent No.: US 8,456,948 B2
(45) Date of Patent: Jun. 4, 2013

(54) SYSTEM AND TECHNIQUE TO OBTAIN STREAMER DEPTH AND SHAPE AND APPLICATIONS THEREOF

(75) Inventors: Nicolas Goujon, Oslo (NO); Johan O. A. Robertsson, Grantchester (GB)

(73) Assignee: WesternGeco L.L.C., Houston, TX (US)

( * ) Notice: Subject to any disclaimer, the term of this patent is extended or adjusted under 35 U.S.C. 154(b) by 529 days.

(21) Appl. No.: 12/164,041

(22) Filed: Jun. 28, 2008

(65) Prior Publication Data

US 2009/0323467 A1 Dec. 31, 2009

(51) Int. Cl.
*G01V 1/38* (2006.01)

(52) U.S. Cl.
USPC .............................................. 367/19; 367/21

(58) Field of Classification Search
USPC .......................................... 367/19, 20, 24, 21
See application file for complete search history.

(56) References Cited

U.S. PATENT DOCUMENTS

| | | | |
|---|---|---|---|
| 6,681,887 B1 * | 1/2004 | Kragh et al. | 181/110 |
| 7,068,568 B2 | 6/2006 | Robertsson | |
| 7,203,130 B1 * | 4/2007 | Welker | 367/16 |
| 7,336,561 B2 | 2/2008 | Borresen | |
| 7,660,189 B2 * | 2/2010 | Vigen et al. | 367/15 |
| 7,701,803 B2 * | 4/2010 | Welker | 367/19 |
| 2005/0013194 A1 | 1/2005 | Vaage et al. | |
| 2005/0180263 A1 * | 8/2005 | Lambert et al. | 367/128 |
| 2006/0239122 A1 | 10/2006 | Vigen et al. | |
| 2006/0285434 A1 | 12/2006 | Welker et al. | |
| 2007/0127312 A1 * | 6/2007 | Storteig et al. | 367/15 |

FOREIGN PATENT DOCUMENTS

| | | |
|---|---|---|
| EP | 0089700 A2 | 9/1983 |
| WO | 0037968 A1 | 6/2000 |
| WO | 02/01254 A1 | 1/2002 |
| WO | 03/058281 A1 | 7/2003 |

OTHER PUBLICATIONS

Amundsen, et al., Rough-Sea Deghosting of Streamer Seismic Data using Pressure Gradient Approximations, Geophysics, Jan.-Feb. 2005, pp. V1-V9, vol. 70, No. 1.
Robertsson, et al., Rough-Sea Deghosting using a Single Streamer and a Pressure Gradient Approximation, Geophysics, Nov.-Dec. 2002, pp. 2005-2011, vol. 67, No. 6.
PCT Search Report, dated Jan. 13, 2010, Application No. PCT/US2009/047083.

* cited by examiner

*Primary Examiner* — Ian Lobo (57) ABSTRACT

A technique includes obtaining first measurements acquired by sensors of a towed seismic streamer, which are indicative of an inclination of the streamer. Based at least in part on the measurements, a shape of the streamer while in tow is determined.

20 Claims, 7 Drawing Sheets

SYSTEM AND TECHNIQUE TO OBTAIN STREAMER DEPTH AND SHAPE AND APPLICATIONS THEREOF

BACKGROUND

The invention generally relates to a system and technique to obtain streamer depth and shape and applications thereof.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining first measurements acquired by sensors of a towed seismic streamer, which are indicative of an inclination of the streamer. Based at least in part on the measurements, a shape of the streamer while in tow is determined.

In another embodiment of the invention, a system includes an interface and a processor. The interface receives measurements acquired by sensors of a towed seismic streamer, which are indicative of an inclination of the streamer. The processor determines a shape of the streamer while in tow based at least in part on the measurements.

In yet another embodiment of the invention, an article includes a computer accessible storage medium to store instructions that when executed by a processor-based system cause the processor-based system to receive measurements acquired by sensors of a towed seismic streamer. The measurements are indicative of an inclination of the streamer. The instructions when executed cause the processor-based system to determine a shape of the streamer while in tow based at least in part on the measurements.

Advantages and other features of the invention will become apparent from the following drawing, description and claims.

DETAILED DESCRIPTION

Figure 1:
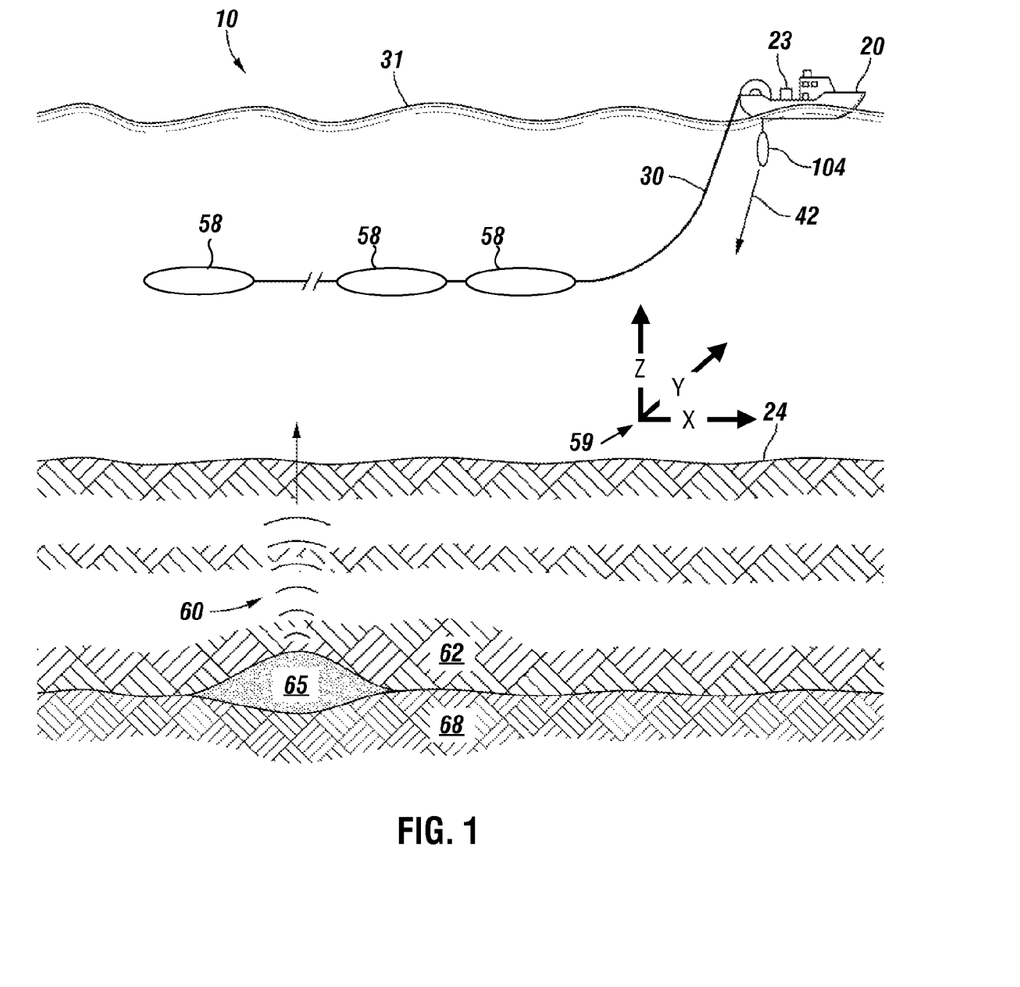
FIG. 1 is a schematic diagram of a marine seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors 58 that record seismic signals.

In accordance with embodiments of the invention, the seismic sensors 58 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source 104 that may be formed from one or more seismic source elements (air guns, for example) and may be towed by the survey vessel 20. Alternatively, in other embodiments of the invention, the seismic source 104 may operate independently of the survey vessel 20, in that the source 104 may be coupled to other vessels or buoys, as just a few examples.

As the seismic streamers 30 are towed, acoustic signals 42 (an exemplary acoustic signal 42 being depicted in FIG. 1), often referred to as "shots," are produced by the seismic source 104 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion (if the sensors are particle motion sensors). The traces are recorded and may be at least partially processed by a signal processing unit 23 that is deployed on the survey vessel 20, in accordance with some embodiments of the invention. For example, a particular multi-component seismic sensor may provide a trace, which corresponds to a measurement of a pressure wavefield by its hydrophone; and the sensor may provide one or more traces that correspond to one or more components of particle motion, which are measured by its accelerometers.

Figure 7:
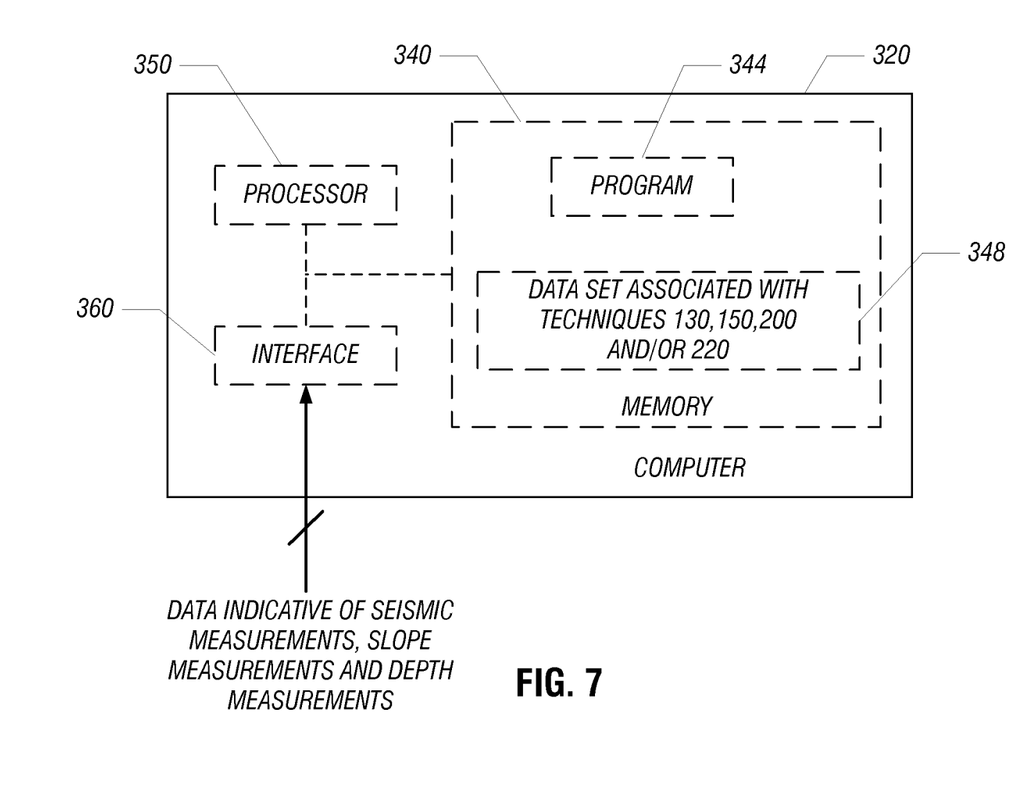
FIG. 7 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 7 and is further described below) that may be, for example, located on land on the vessel 20. Furthermore, at least part of the seismic data processing system may be located on the streamers 30. Thus, many variations are possible and are within the scope of the appended claims.

All parts of the streamer 30 are not towed at the same depth. In this regard, the streamer 30 is not always flat, some parts of the streamer 30 may be heavier than other parts, ballasting is not perfect, and the swell may also play a part in causing the depth and shape of the streamer 30 to vary while in tow. Thus, for purposes of accurately processing seismic measurements acquired by the seismic sensors 58 of the streamer 30, techniques and systems are described herein to determine the shape of the streamer 30 while in tow and determine the depths of the seismic sensors 58.

More specifically, in accordance with some embodiments of the invention described herein, measurements that are acquired by sensors of the streamer 30 are used to derive the shape of the streamer 30 in the inline (x) and vertical (z) plane. From the determined shape, the accurate depth of any seismic sensor 58 along the streamer 30 may be determined, and the seismic measurements acquired by the seismic sensors 58 may therefore be corrected to compensate for sensor depth variations.

Figure 2:
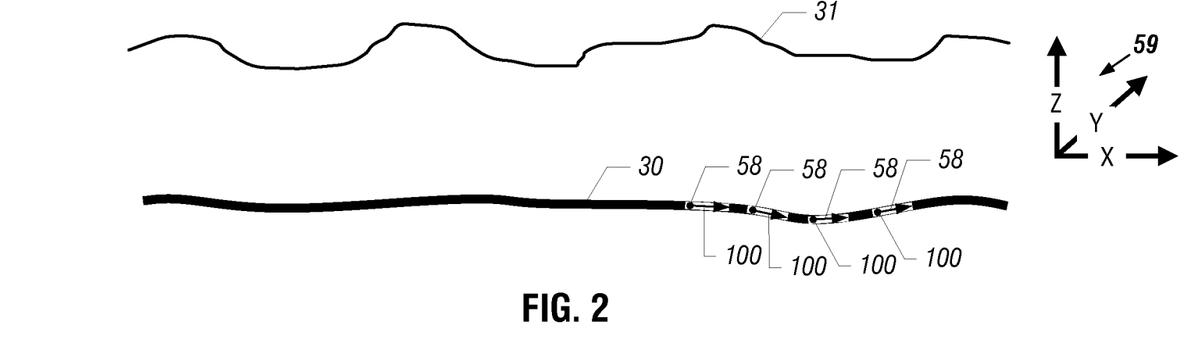
FIG. 2 is an illustration of an exemplary streamer while in tow according to an embodiment of the invention.

FIG. 2 depicts an illustration of the sea surface 31 and an exemplary streamer 30 while in tow. Conventionally, a streamer may have depth sensors that are mounted on the streamer and have a spacing on the order of hundreds of meters. The depth sensors may be co-located with depth controlling devices, called "birds." The birds typically are programmed to steer at the same fixed depth, and the depth of the seismic sensors between these measurement points are generally assumed to be constant. However, as depicted in FIG. 2, this assumption may be incorrect, as the streamer 30 is not always flat and thus, the depths of the seismic sensors 58 may significantly vary due to the factors that are set forth above.

In accordance with embodiments of the invention described herein, measurements that are acquired by sensors on the streamer 30 are used for purposes of determining the streamer's shape in the x-z plane (see axes 59 in FIG. 2). More specifically, in accordance with some embodiments of the invention, the seismic sensors 58 are multi-component sensors, which provide inline measurements (i.e., measurements in the x, or inline, direction) of particle motion (inline acceleration measurements, for example). These inline measurements may, in turn, be used for purposes of determining the streamer's shape.

In general, the DC, or average, value of the inline particle motion measurement provides an indication of a slope, or tangent 100, of the streamer 30 at the location of each seismic sensor 58, as shown in FIG. 2. Alternatively, in accordance with other embodiments of the invention, the streamer 30 may include inclinometers to provide indications of the slope of the streamer 30 at each inclinometer.

Regardless of the type of sensor used to acquire the inline slope measurements, the inline measurements constitute a spatial derivative of the vertical shape of the streamer 30 (i.e., the shape of the streamer 30 in the x-z plane). Therefore, in accordance with embodiments of the invention, the inline measurements are spatially integrated for purposes of deriving a shape profile of the streamer 30, and the solution may be constrained by the relatively sparse depth measurements (acquired by depth sensors of the streamer 30, for example) for purposes of generating the depth profile for the streamer 30.

Figure 3:
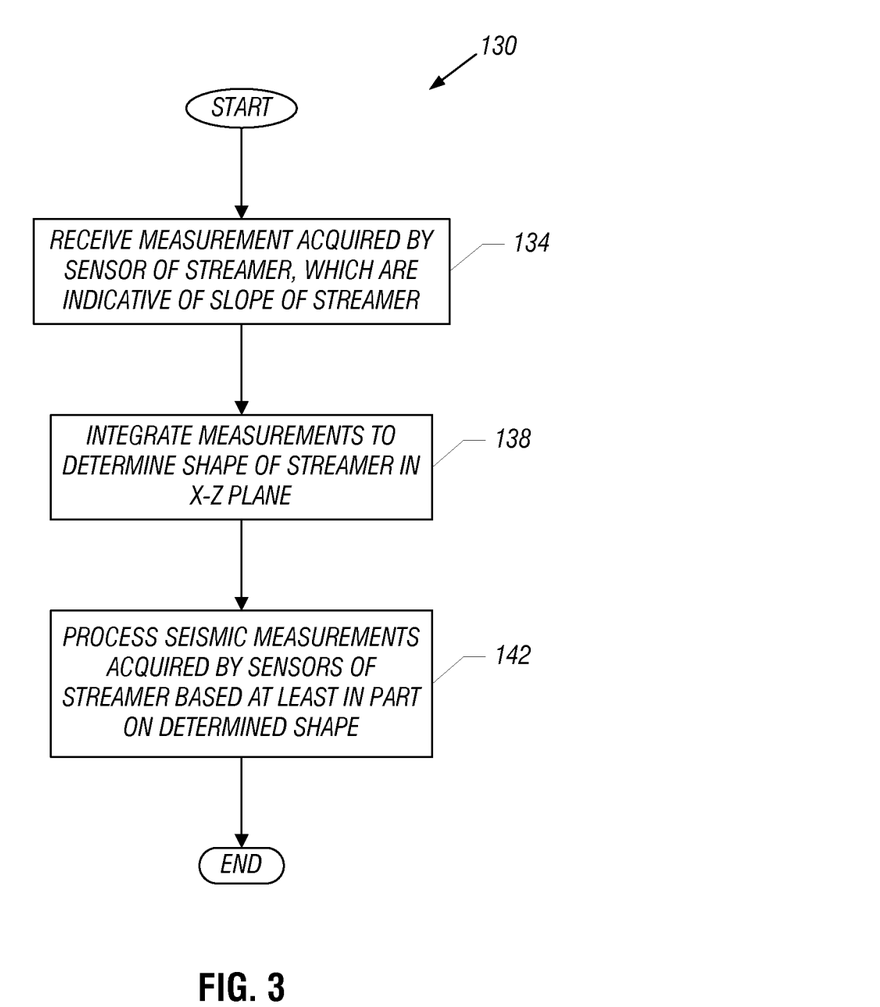
FIG. 3 is a flow diagram depicting a technique to determine the shape of a towed seismic streamer according to an embodiment of the invention.

Therefore, referring to FIG. 3, in accordance with embodiments of the invention described herein, a technique 130 includes receiving seismic measurements that are acquired by sensors of a streamer 30 and are indicative of the inclination, or slope, of the streamer 30, pursuant to block 134. The measurements are integrated (block 138) to determine the shape of the streamer 30 in the x-z plane (see axes 59 in FIG. 2). The seismic measurements that are acquired by the seismic sensors 58 of the streamer 30 may then be processed (block 142) based at least in part on the determined shape. As set forth below, the processing may include using the determined shape and/or determined depth for such purposes as deghosting, time shift correction and quality control.

Figure 4:
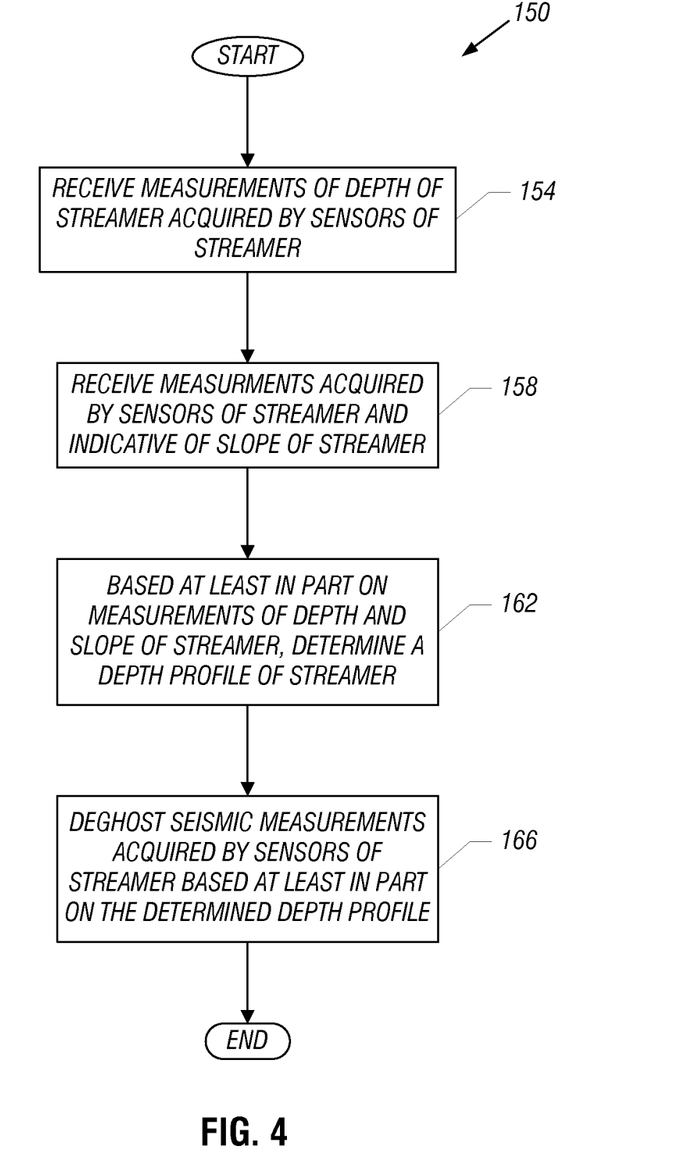
FIG. 4 is a flow diagram depicting a technique to determine the depth profile of a towed seismic streamer and use the determined depth to deghost seismic measurements acquired by seismic sensors of the streamer according to an embodiment of the invention.

For example, in accordance with embodiments of the invention, the determined shape profile may be used as an input to an algorithm to deghost the seismic measurements. More specifically, FIG. 4 depicts a technique 150 in accordance with some embodiments of the invention. Pursuant to the technique 150, both depth measurements and slope measurements acquired by sensors of the streamer 30 are received, pursuant to blocks 154 and 158. Based at least in part on the measurements of the depth and the slope of the streamer 30, a depth profile of the streamer 30 is determined, pursuant to block 162. The seismic measurements that are acquired by the seismic sensors 58 of the streamer 30 may then be deghosted (block 166) based at least in part on the determined depth profile.

As examples, the deghosting of seismic measurements is described in U.S. Pat. No. 7,068,568 entitled, "METHOD OF PROCESSING SEISMIC DATA," issued on Jun. 27, 2006; WO Patent No. 0201254; Amundsen, L., Roesten, T., and Robertsson, J., "Rough-Sea Deghosting of Seismic Data Using Vertical Partial Velocity Approximations," patent application 2002; Robertsson J. O. A., and Kragh, E., "Rough Sea Deghosting Using A Single Streamer And A Pressure Gradient Approximation," Geophysics, 67, 2005-2011, 2002; and Amundsen, L., Roesten, T., and Robertsson, J. O. A., "Rough-Sea Deghosting of Seismic Data Using Pressure Gradient Approximations," Geophysics, 70, V1-V9, 2005.

The determined streamer depth profile may be used for purposes of statics corrections in the case where the streamer 30 moves with the sea surface 31. The wave height determination used in connection with deghosting does not distinguish between a moving sea surface and the movement of the streamer 30 in the vertical direction. Therefore, by using the above-described technique of determining the shape of the streamer 30 while in tow, corrections may be made for small time-shifts in the recorded data arising from the fact that the relative location of the seismic sensors 58 with respect to the water bottom and underlying geology varies.

Figure 5:
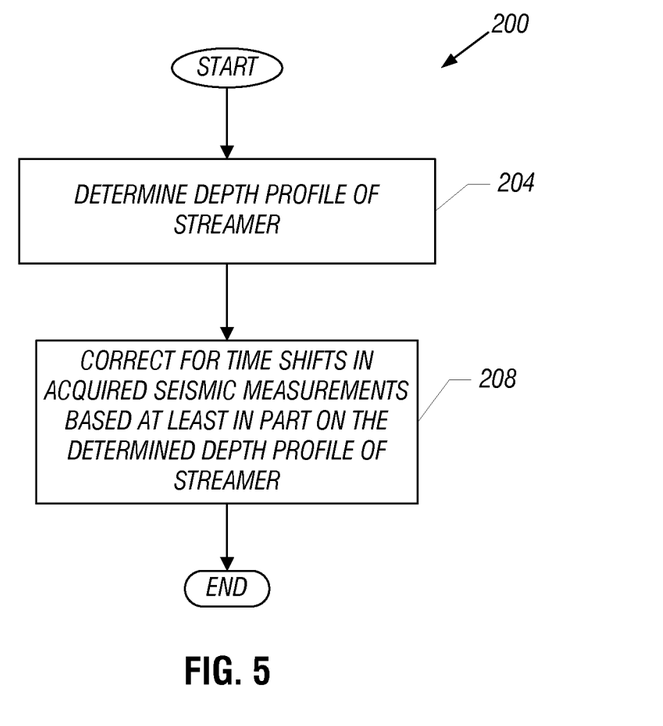
FIG. 5 is a flow diagram depicting a technique to correct for time shifts in seismic measurements acquired by seismic sensors of a streamer according to an embodiment of the invention.

Thus, referring to FIG. 5, a technique 200 in accordance with embodiments of the invention includes determining (block 204) the depth profile of a streamer 30 and correcting (block 208) for time shifts in acquired seismic measurements based at least in part on the determined depth profile of the streamer 30.

The determined shape profile of the streamer 30 may also be useful as a quality control tool, as the shape reveals which parts of the streamer 30 are not substantially flat and thus, identifies which particular seismic measurements may degrade the overall quality of the acquired set of seismic measurements. Thus, for example, seismic measurements that are acquired by seismic sensors 58 that are disposed on flatter portions of the streamer 30 may be more heavily weighted in the seismic data processing, as compared to seismic measurements acquired from seismic sensors 58, which are disposed on segments of the streamer 30, which are not substantially flat.

Figure 6:
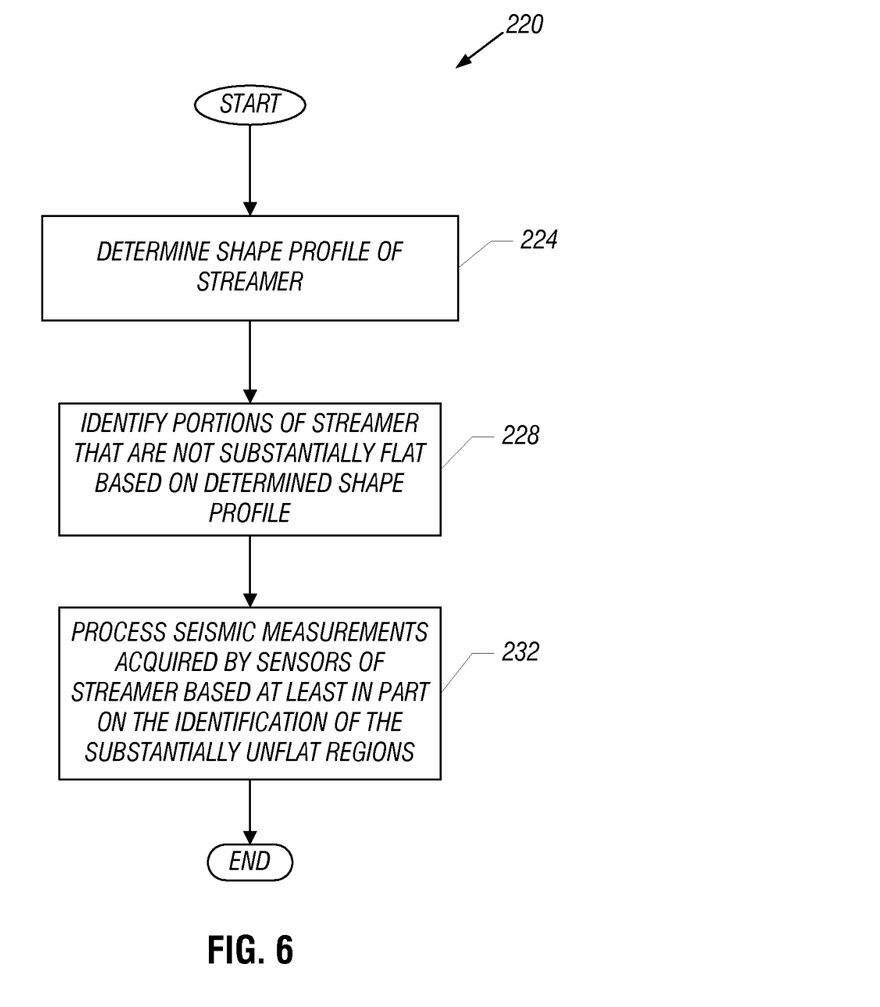
FIG. 6 is a flow diagram depicting a technique to process seismic measurements acquired by seismic sensors of a streamer based on a determined shape profile of the streamer according to an embodiment of the invention.

Therefore, referring to FIG. 6, a technique 220 in accordance with embodiments of the invention includes determining (block 224) a shape profile of a seismic streamer 30 and identifying (block 228) portions of the streamer 30 that are not substantially flat, based at least in part on the determined shape profile. Seismic measurements that are acquired by the seismic sensors in the streamer 30 may then be processed based at least in part on the identification of the substantially unflat regions, pursuant to block 232.

Referring to FIG. 7, in accordance with some embodiments of the invention, a data processing system 320 may perform at least some of the techniques 130, 150, 200 and/or 220 that are disclosed herein for such purposes as determining a shape profile of a streamer 30, determining a depth profile of a streamer 30, deghosting seismic measurements using the determined depth profile, performing time correction using the determined depth profile, using the determined shape profile of the streamer 30 as a quality control measure, etc. The system 320 may be located on one of the streamers 30, on each streamer 30, distributed among the streamers 30, on the seismic source 104, on the survey vessel 30, at a remote land-based facility, etc. In accordance with some embodiments of the invention, the system 320 may include a processor 350, such as one or more microprocessors and/or microcontrollers.

The processor 350 may be coupled to a communication interface 360 for purposes of receiving data indicative of seismic measurements, streamer slope measurements and streamer depth measurements. The data pertaining to the seismic measurements may be pressure data, multi-component data, inclinometer data, depth sensor data, etc. The data indicative of the seismic measurements may also indicate the slope measurements if the seismic sensors 58 provide inline particle motion measurements. Alternatively, the slope measurement data may be acquired by sensors (inclinometers, for example) that are separate from the seismic sensors 58. The depth measurements may be acquired by depth sensors of the streamers 30.

As a non-limiting example, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets involved with the techniques that are described herein. The memory 340 may store program instructions 344, which when executed by the processor 350, may cause the processor 350 to perform one or more of the techniques 130, 150, 200 and/or 220 that are disclosed herein, and display results obtained via the technique(s) on a display (not shown in FIG. 7) of the system 320, in accordance with some embodiments of the invention. For example, the display may be an image that depicts the shape profile of a streamer, the result of a deghosting analysis, the depth profile of a streamer, time shift corrections, etc.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    obtaining first measurements acquired by multi-component seismic sensors of a towed seismic streamer;
    based at least in part on the first measurements, determining a shape of the streamer while in tow, wherein the first measurements comprise inline measurements and determining the shape of the streamer comprises spatially integrating at least some of the inline measurements; and
    processing seismic measurements acquired by the sensors of the towed seismic streamer in a processor-based machine based at least in part on the determined shape.

2. The method of claim 1, further comprising:
    obtaining depth measurements of the streamer; and
    based at least in part on the first measurements and depth measurements, determining a depth profile of the streamer.

3. The method of claim 2, further comprising:
deghosting the seismic measurements based at least in part on the determined depth profile.

4. The method of claim 1, further comprising:
correcting time shifts present in the seismic measurements based at least in part on the determined shape.

5. The method of claim 1, wherein the act of obtaining the first measurements comprises obtaining the first measurements from inclinometers.

6. The method of claim 1, wherein the processing includes identifying at least one segment of the streamer that is substantially not flat based at least in part on the determined shape, and the processing further includes selectively weighting each of the seismic measurements based at least in part on whether the seismic sensor acquiring the seismic measurement is disposed in said at least one segment.

7. An article comprising a computer accessible storage medium storing instructions that when executed by a processor-based system cause the processor-based system to:
receive first measurements acquired by multi-component seismic sensors of a seismic streamer, wherein the first measurements comprise inline measurements;
spatially integrate at least some of the inline measurements to determine a shape of the streamer while in tow; and
process seismic measurements acquired by the sensors of the towed seismic streamer based at least in part on the determined shape.

8. The article of claim 7, the storage medium storing instructions that when executed by the processor-based system cause the processor-based system to determine a depth profile of the streamer while in tow based at least in part on the first measurements and depth measurements of the streamer.

9. The article of claim 8, the storage medium storing instructions that when executed by the processor-based system cause the processor-based system to deghost seismic measurements acquired by seismic sensors of the streamer while in tow based at least in part on the determined depth profile.

10. The article of claim 8, the storage medium storing instructions that when executed by the processor-based system cause the processor-based system to correct time shifts present in seismic measurements acquired by seismic sensors of the streamer while in tow based at least in part on the determined depth profile.

11. The article of claim 7, the storage medium storing instructions that when executed by the processor-based system cause the processor-based system to identify at least one segment of the streamer that is substantially not flat based at least in part on the determined shape and process seismic measurements acquired by seismic sensors of the streamer while in tow based at least in part on the identified said at least one segment.

12. The article of claim 7, the storage medium storing instructions that when executed by the processor-based system cause the processor-based system to:
identify at least one segment of the streamer that is substantially not flat based at least in part on the determined shape; and
selectively weight each of the seismic measurements based at least in part on whether the seismic sensor acquiring the seismic measurement is disposed in said at least one segment.

13. A system comprising:
an interface to receive first measurements acquired by multi-component seismic sensors of a towed seismic streamer; and
a processor adapted to:
determine a shape of the streamer while in tow, wherein the first measurements comprise inline measurements and the processor is adapted to spatially integrate at least some of the inline measurements to determine the shape of the streamer; and
process seismic measurements acquired by the sensors of the towed seismic streamer based at least in part on the determined shape.

14. The system of claim 13, wherein the processor is part of the streamer.

15. The system of claim 13, further comprising:
the streamer; and
a survey vessel to tow the streamer.

16. The system of claim 13, wherein
the interface is adapted to receive depth measurements of the streamer, and
the processor is adapted to determine a depth profile of the streamer while in tow based at least in part on the first measurements and the depth measurements.

17. The system of claim 16, wherein the processor is adapted to deghost seismic measurements acquired by seismic sensors of the streamer while in tow based at least in part on the determined depth profile.

18. The system of claim 13, wherein the processor is adapted to correct time shifts present in seismic measurements acquired by seismic sensors of the streamer while in tow based at least in part on the determined shape.

19. The system of claim 13, wherein the processor is adapted to identify at least one segment of the streamer that is substantially not flat based at least in part on the determined shape and process seismic measurements acquired by seismic sensors of the streamer while in tow based at least in part on said at least one identified segment.

20. The system of claim 13, wherein the processor is further adapted to:
identify at least one segment of the streamer that is substantially not flat based at least in part on the determined shape; and
selectively weight each of the seismic measurements based at least in part on whether the seismic sensor acquiring the seismic measurement is disposed in said at least one segment.

* * * * *